United States Patent
Stevenson et al.

(10) Patent No.: US 7,402,124 B2
(45) Date of Patent: Jul. 22, 2008

(54) CONTROL METHOD AND APPARATUS FOR A TRANSMISSION CLUTCH SYSTEM

(75) Inventors: Paul D. Stevenson, Ann Arbor, MI (US); Hamid Vahabzadeh, Oakland, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 322 days.

(21) Appl. No.: 11/386,408

(22) Filed: Mar. 22, 2006

(65) Prior Publication Data
US 2007/0221467 A1 Sep. 27, 2007

(51) Int. Cl.
*F16H 61/38* (2006.01)
(52) U.S. Cl. .......................... 477/158; 477/86; 477/168
(58) Field of Classification Search .................. 477/86, 477/158, 168
See application file for complete search history.

(56) References Cited
U.S. PATENT DOCUMENTS 3,951,465 A * 4/1976 Stage ...................... 303/116.3
5,342,246 A * 8/1994 Mori ............................. 474/1
5,902,344 A * 5/1999 Eike et al. ..................... 701/67
6,450,309 B1 * 9/2002 Hirai et al. ................. 192/3.63
6,882,925 B2 * 4/2005 Nohara et al. ............... 701/101

* cited by examiner

*Primary Examiner*—Ha D. Ho

(57) ABSTRACT

A more efficient method for maintaining the hydraulic actuation of a selectively engageable torque transmitting device in a vehicle. The method includes generating a predetermined pressure level of a hydraulic fluid such as, for example, with a pump. The pressurized hydraulic fluid is transferred through an open valve and to a selectively engageable torque transmitting device such that the selectively engageable torque transmitting device is engaged. Thereafter, the valve is closed so that the predetermined pressure level of hydraulic fluid at the selectively engageable torque transmitting device remains relatively constant. Accordingly, the selectively engageable torque transmitting device remains engaged without continuously generating additional pressure such that the fuel economy of the vehicle is improved. A corresponding apparatus is also provided.

15 Claims, 3 Drawing Sheets

CONTROL METHOD AND APPARATUS FOR A TRANSMISSION CLUTCH SYSTEM

TECHNICAL FIELD

The present invention pertains generally to a method and apparatus for controlling the hydraulic actuation of a selectively engageable torque transmitting device.

BACKGROUND OF THE INVENTION

Hybrid vehicle powertrains may include a transmission having a plurality of selectively engageable torque transmitting devices. The selectively engageable torque transmitting devices are typically clutches which are hydraulically controlled. Actuation of the clutches generally requires a pump configured to provide pressurized hydraulic fluid. If a clutch is actuated for an extended period of time, a conventional system requires that a pump continuously provide pressurized hydraulic fluid for the entire duration during which the clutch is engaged. This requirement contributes to excessive spin losses which diminish the overall efficiency of the vehicle. In some of these transmissions, the clutches can be sealed with very little leak down of pressure and only need to apply or release one clutch at a time.

SUMMARY OF THE INVENTION

The present invention provides a method for controlling the hydraulic actuation of a selectively engageable torque transmitting device in a vehicle. The method includes generating a predetermined pressure level of a hydraulic fluid such as, for example, with a pump. The pressurized hydraulic fluid is transferred through an open valve and to a selectively engageable torque transmitting device such that the selectively engageable torque transmitting device is engaged. Thereafter, the valve is closed so that the predetermined pressure level of hydraulic fluid at the selectively engageable torque transmitting device remains relatively constant. Accordingly, the selectively engageable torque transmitting device remains engaged without continuously generating additional pressure such that the pump losses are decreased and thus the fuel economy of the vehicle is improved.

The valve is preferably a latching valve configured to hold a given pressure level with minimal pressure loss over time.

The method of the present invention preferably also includes monitoring the pressure of the hydraulic fluid with a sensor disposed near the selectively engageable torque transmitting device.

The method of the present invention preferably also includes generating additional pressure if the monitored pressure of the hydraulic fluid drops below a predefined minimum pressure value.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
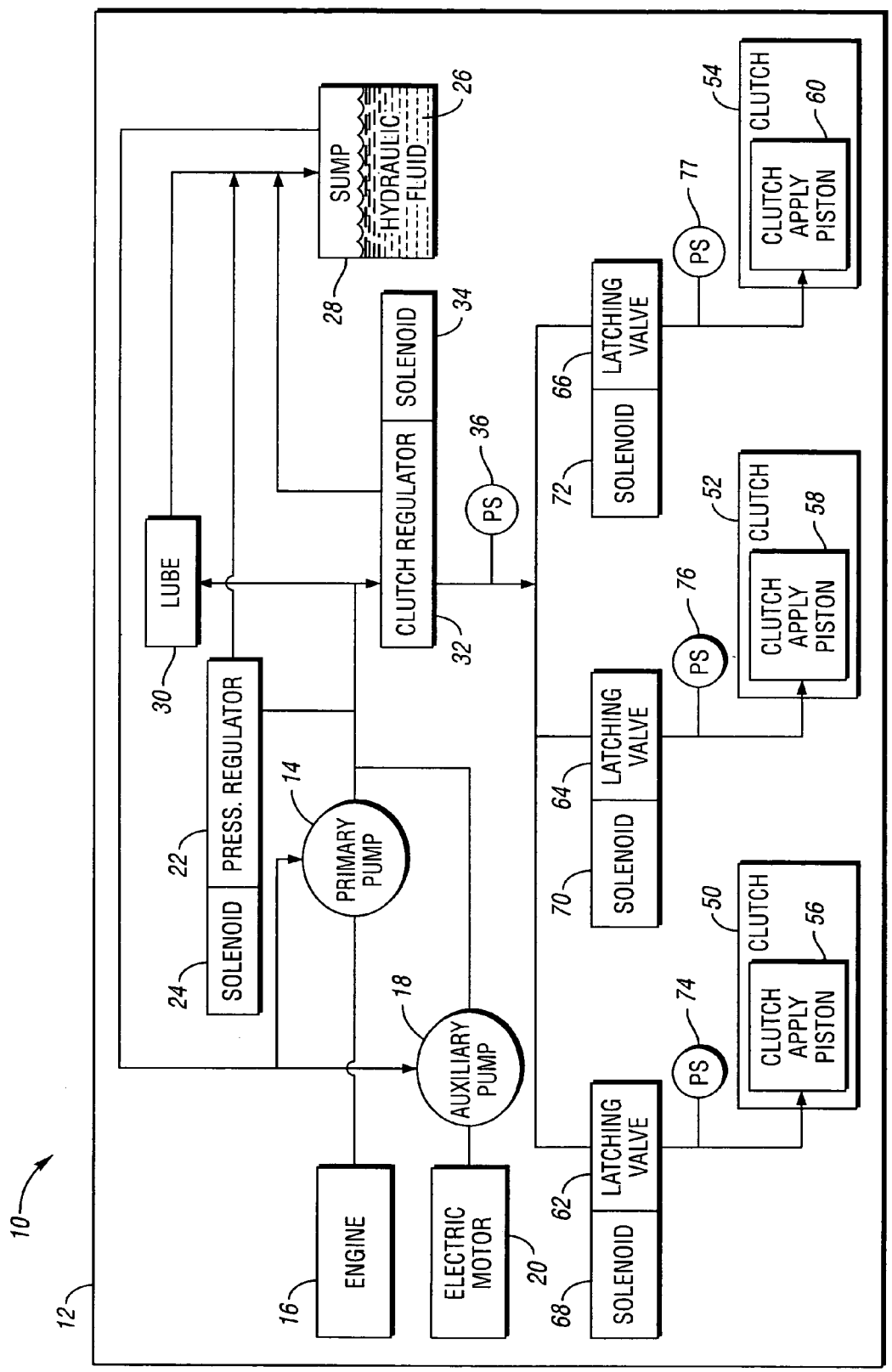
FIG. 1 is a schematic diagram of a hybrid vehicle having a latching clutch system in accordance with the present invention.

Referring to the drawings, wherein like reference numbers refer to like components, FIG. 1 shows a latching clutch system 12 as part of a vehicle 10. The vehicle 10 will hereinafter be described as a hybrid electric vehicle; however it should be appreciated that the clutch system 12 may be adapted for use with other vehicles. For purposes of the present invention, a latching clutch system is a clutch system which can generate a predetermined amount of hydraulic pressure, and thereafter latch or hold constant the hydraulic pressure without continuously generating pressure to maintain clutch capacity. As an example, a latching clutch system may generate a hydraulic pressure of 200 psi with, for example, a transmission pump, in order to engage a transmission clutch. The latching clutch system is then configurable to lock or hold constant the 200 psi of pressure such that the transmission clutch remains engaged without continuously running the transmission pump to generate such pressure. Accordingly, after generating the initial clutch apply pressure of 200 psi, the latching clutch system of this invention conserves the energy otherwise required to continuously run the transmission pump such that the clutch system is more efficient and the overall fuel economy of the vehicle is improved.

The latching clutch system 12 includes a primary pump 14 which is operatively connected to and driven by an engine 16. The latching clutch system 12 also includes an auxiliary pump 18 which is operatively connected to and driven by an electric motor 20. Although the preferred embodiment is shown with both a primary pump 14 and an auxiliary pump 18, it should be appreciated that the pumps 14, 18 may optionally be replaced by a single pump or any known device adapted to transfer fluid and generate pressure such as, for example, a ball screw driven piston (not shown) in a hydrostatically applied clutch. The electric motor 20 is preferably a 1,000 Watt electric motor provided to drive the auxiliary pump 18, however the auxiliary pump 18 may alternatively be driven by an electric motor/generator (not shown) implemented to power the hybrid vehicle 10.

When the hybrid vehicle 10 is being powered by the engine 16, the engine 16 is also preferably implemented to drive the primary pump 14. When the engine 16 is off such as, for example, when the hybrid vehicle 10 is being powered by an electric motor/generator (not shown), the electric motor 20 is preferably implemented to drive the auxiliary pump 18. The pumps 14, 18 transfer hydraulic fluid 26 from a sump 28 to meet the cooling, lubrication, and pressure requirements of the hybrid vehicle 10.

A pressure regulator 22 regulates the pressure level of the hydraulic fluid 26 output by the pumps 14, 18. According to the preferred embodiment, the pumps 14, 18 are fixed displacement pumps and the pressure regulator 22 maintains a predetermined pressure level by bleeding off any excess hydraulic fluid 26. As an example, if a pressure of 200 psi is required and one of the fixed displacement pumps 14, 18 is providing sufficient flow to produce 250 psi, the pressure regulator bleeds off enough hydraulic fluid 26 to maintain the downstream pressure at 200 psi. The hydraulic fluid 26 bled off by the pressure regulator 22 is transferred back to the sump 28 which may thereafter be re-circulated to meet additional cooling, lubrication or pressure needs of the hybrid vehicle 10. A solenoid 24 preferably receives a signal from a control module (not shown) indicating the desired pressure level, and thereafter actuates the pressure regulator 22 by an amount necessary to bleed off any excess pressure such that the desired pressure level is maintained. It should be appreciated that the preferred fixed displacement pumps 14, 18 may alternatively be replaced with variable displacement pumps such that the pressure regulator 22 would control the pump displacement.

The output from the pumps 14, 18 is transferred to a lubrication system 30 and a clutch pressure regulator 32. The lubrication system 30 preferably includes a plurality of lubrication channels (not shown) configured to direct the hydraulic fluid 26 to areas of the transmission that require lubrication and/or cooling. Thereafter, the hydraulic fluid 26 is transferred from the lubrication system 30 back to the sump 28 such that it may be re-circulated to meet additional cooling, lubrication or pressure needs of the hybrid vehicle 10.

The clutch pressure regulator 32 is implemented to regulate the pressure of the hydraulic fluid 26 transferred to a plurality of selectively engageable torque transmitting devices such as the clutches 50, 52, 54. The clutch pressure regulator 32 maintains a predetermined pressure level at the feed to the latching valves 62, 64, 66 by bleeding off excess hydraulic fluid 26. The hydraulic fluid 26 bled off by the pressure regulator 32 is transferred back to the sump 28 which may thereafter be re-circulated to meet additional cooling, lubrication or pressure needs of the hybrid vehicle 10. A solenoid 34 preferably receives a signal from a control module (not shown) indicating the desired clutch pressure level, and thereafter actuates the pressure regulator 32 by an amount necessary to bleed off any excess pressure such that the desired clutch pressure level is maintained. A pressure sensor 36 measures the pressure of the hydraulic fluid 26 downstream from the clutch pressure regulator 32. The data from the pressure sensor 36 is transferable to the solenoid 34 such that pressure of the hydraulic fluid 26 transferred to the clutches 50, 52, 54 may be more precisely regulated. In other words, the pressure sensor 36 provides feedback to the solenoid 34 to ensure that the downstream pressure of the hydraulic fluid 26 sensed at 36 more closely approximates the desired clutch pressure.

The hydraulic fluid 26 passing through the clutch pressure regulator 32 is then transferred to one or more of the clutches 50, 52, and 54. Three clutches 50, 52 and 54 are shown for illustrative purposes, however, it should be appreciated that alternate embodiments of the present invention may incorporate fewer clutches or additional clutches. The clutches 50, 52, and 54 respectively include clutch apply pistons 56, 58 and 60. The apply pistons 56, 58 and 60 are hydraulically actuated by pressurized hydraulic fluid 26 from at least one of the pumps 14, 18. Actuation of the apply pistons 56, 58 and 60 respectively apply the clutches 50, 52, and 54 such as, for example, would be required to engage a commanded speed ratio of the transmission of the hybrid vehicle 10.

The schematic diagram of FIG. 1 shows the application in which only one clutch is applied or released at a time. It should be appreciated by those skilled in the art that the use of additional clutch pressure regulators similar to the clutch pressure regulator 32 would allow multiple clutches to be applied and released simultaneously.

A plurality of latching valves 62, 64, and 66 are respectively disposed between the clutch pressure regulator 32 and each of the clutches 50, 52, and 54. The latching valves 62, 64, and 66 are so named because, when they are in a closed position, downstream pressure is latched or held relatively constant without the introduction of additional pressure. Additionally, when the latching valves 62, 64, and 66 are closed and the downstream pressure is at or near zero, an upstream increase in pressure (e.g., at pressure sensor 36) is not transferred therethrough such that the respective clutches 50, 52 and 54 do not engage. As an example, assume the primary pump 14 is transferring hydraulic fluid 26 at 200 psi through the open latching valve 62 and to the clutch apply piston 56 in order to engage the clutch 50. The latching valve 62 can be closed such that the pressure of the hydraulic fluid 26 at the clutch apply piston 56 remains at approximately 200 psi and the clutch 50 correspondingly remains engaged without continuously running the pump 14. Accordingly, the energy otherwise required to continuously run the pump 14 is conserved such that the clutch system 12 is more efficient and the overall fuel economy of the vehicle 10 may be improved.

The latching valves 62, 64, and 66 are known and are commercially available, for example, from Eaton Corporation of Southfield, Michigan (model number SBV11-8-0). According to a preferred embodiment, the latching valves 62, 64, and 66 each include a return spring (not shown) respectively adapted to bias the latching valves 62, 64, and 66 into an open position such that hydraulic fluid 26 is transferable therethrough. A solenoid 68 selectively generates an apply pressure sufficient to overcome the return spring bias and thereby close the latching valve 62. Similarly, solenoids 70 and 72 selectively generate an apply pressure sufficient to respectively close the latching valves 64 and 66. A pressure sensor 74 is located between the latching valve 62 and the clutch apply piston 56, a pressure sensor 76 is located between the latching valve 64 and the clutch apply piston 58, and a pressure sensor 77 is located between the latching valve 66 and the clutch apply piston 60. The pressure sensors 74, 76, and 77 are configured to respectively monitor pressure levels and transmit a signal if a respective pressure drops below a predefined threshold level as will be described in detail hereinafter.

Having described the apparatus of the present invention hereinabove, the preferred method for controlling the latching clutch system 12 to engage one of the clutches 50, 52, 54 in a fuel efficient manner will now be described. The latching valves 62, 64 and 66 function similarly to respectively control the engagement of the clutches 50, 52 and 54. Therefore, for exemplary purposes, the latching valve 62 and its corresponding clutch 50 will be described in detail hereinafter with the understanding that the latching valves 64, 66 operate in a similar manner.

Figure 2:
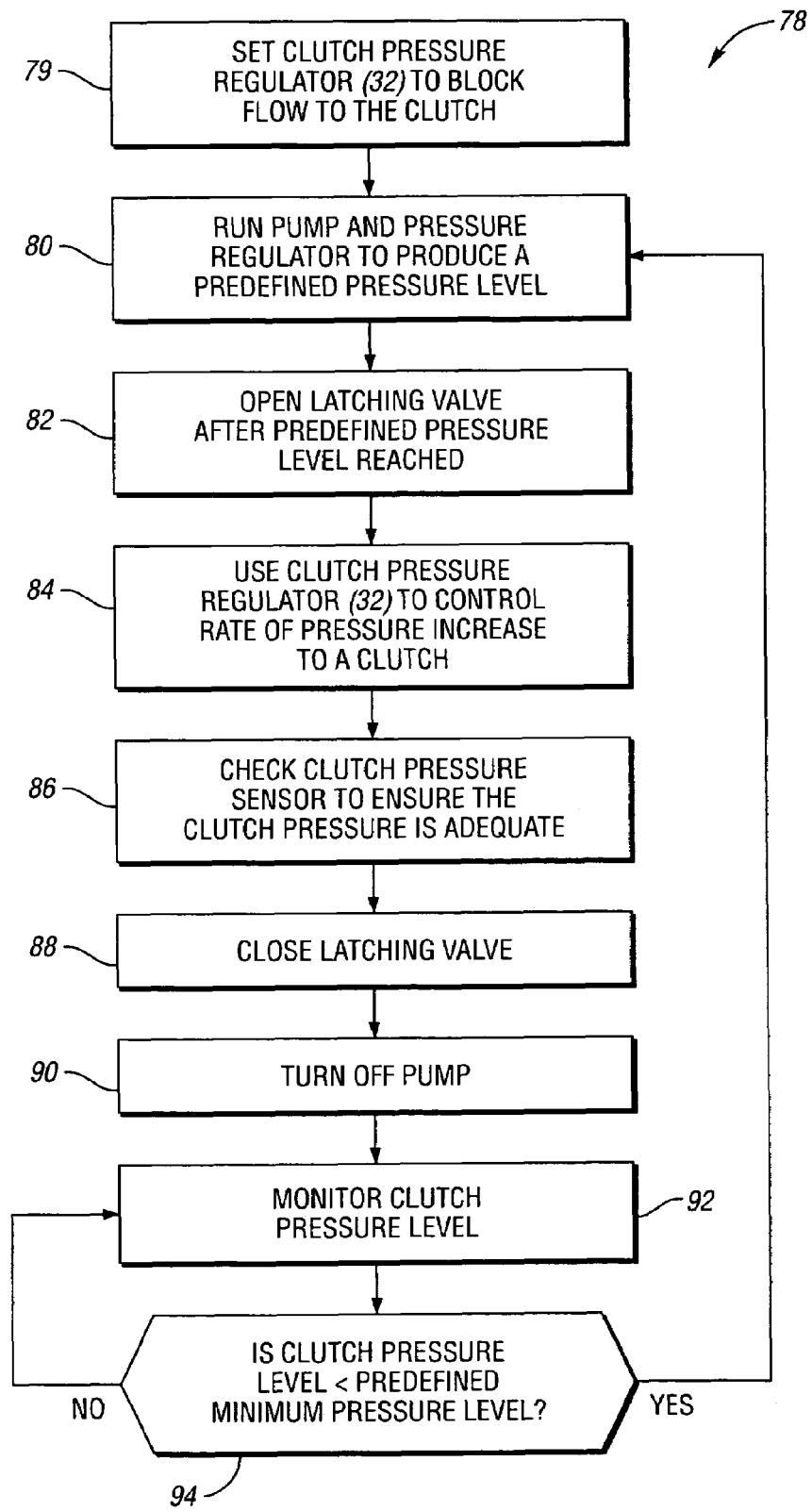
FIG. 2 is a flow chart illustrating the preferred method of applying a clutch in accordance with the present invention.

Referring to FIG. 2, a method 78 (also referred to herein as algorithm 78) for engaging a clutch (e.g., clutch 50 shown in FIG. 1) is shown. More precisely, FIG. 2 shows a block diagram representing steps performed by a control device such as a conventional control module (not shown). For illustrative purposes, assume the apply pressure required to actuate the clutch apply piston 56 (shown in FIG. 1) and thereby engage the clutch 50 (shown in FIG. 1) is 200 psi.

At step 79 of the algorithm 78, the clutch pressure regulator 32 (shown in FIG. 1) is set to block the flow of hydraulic fluid 26 (shown in FIG. 1) to the clutch 50 (shown in FIG. 1). This step is preferably implemented to ensure that there is zero or approximately zero pressure transferred to the clutch 50 as the latching valve 62 (shown in FIG. 1) is opened, and thereafter pressure can be transferred to the clutch 50 at a controlled rate such that the engagement of the clutch 50 is smooth. At step 80, with the clutch pressure regulator 32 blocking the transfer of pressure to the latching valve 62, at least one of the pumps 14, 18 (shown in FIG. 1) and the pressure regulator 22 (shown in FIG. 1) are operated to produce a predefined pressure level of hydraulic fluid 26 (shown in FIG. 1). The predefined pressure level is preferably 20 psi above the actual clutch apply pressure to provide a margin of error and account for potential pressure loss. According to the illustrative example, the actual clutch apply pressure is 200 psi and the predefined pressure level is accordingly 220 psi such that even if there is a slight pressure loss through the latching valve 26, the pressure level at the clutch apply piston 56 (shown in FIG. 1) will not drop below 200 psi and the clutch 50 (shown in FIG. 1) will remain engaged with adequate capacity.

At step 82, the latching valve 62 (shown in FIG. 1) is opened after the pressure of the hydraulic fluid 26 (shown in FIG. 1) reaches 220 psi. When the latching valve 62 is opened, the pressurized hydraulic fluid 26 is transferable to the clutch apply piston 56 (shown in FIG. 1) to engage the clutch 50 (shown in FIG. 1). At step 84, the clutch pressure regulator 32 (shown in FIG. 1) is implemented to control the transfer of hydraulic fluid 26 to the clutch 50. The transfer of hydraulic fluid 26 to the clutch 50 is controlled by the clutch pressure regulator 32 to control the rate of pressure increase at the clutch 50 and thereby ensure the engagement of the clutch 50 is smooth.

At step 86, the pressure sensor 74 (shown in FIG. 1) is checked to ensure the pressure at the clutch 50 (shown in FIG. 1) is adequate (i.e., has reached the desired level of 220 psi). At step 88, after the hydraulic fluid 26 (shown in FIG. 1) has raised the pressure in the clutch 50 to the desired level as detected by the pressure sensor 74, the latching valve 62 (shown in FIG. 1) is closed. As described hereinabove, when the latching valve 62 is closed the downstream pressure at the clutch apply piston 56 (shown in FIG. 1) remains generally constant. Therefore, the clutch 50 will remain engaged with adequate capacity regardless of the pressure level produced by the pumps 14, 18 (shown in FIG. 1).

At step 90 of the algorithm 78, the pumps 14, 18 (shown in FIG. 1) are turned off or their output is reduced (e.g., to meet the needs of the lubrication system 30) in order to conserve energy and improve the fuel economy of the hybrid vehicle 10 (shown in FIG. 1). The pumps 14, 18 may be implemented to meet the needs of the lubrication system 30 (shown in FIG. 1), but are not required to maintain engagement of the clutch 50 (shown in FIG. 1). At step 92, the pressure of the hydraulic fluid 26 (shown in FIG. 1) at the clutch apply piston 56 (shown in FIG. 1) is monitored by the pressure sensor 74 (shown in FIG. 1). This step is preferably implemented to account for a potential pressure loss through the latching valve 62 (shown in FIG. 1) or other leaks over time. At step 94, the algorithm 78 determines if the pressure of the hydraulic fluid 26 monitored by the pressure sensor 74 drops below a predefined minimum pressure level. According to a preferred embodiment, the predefined minimum pressure level is 201 psi. If, at step 90, the monitored pressure level is not below 201 psi, the algorithm 78 returns to step 88. If, at step 90, the monitored pressure level is below 201 psi, the algorithm 78 returns to step 80. Therefore, if there is a pressure loss through the latching valve 62 over time and the pressure level drops below 201 psi, at least one of the pumps 14, 18 is implemented to bring the pressure level back up to 220 psi and thereby ensure the clutch 50 is not prematurely released or disengaged.

Figure 3:
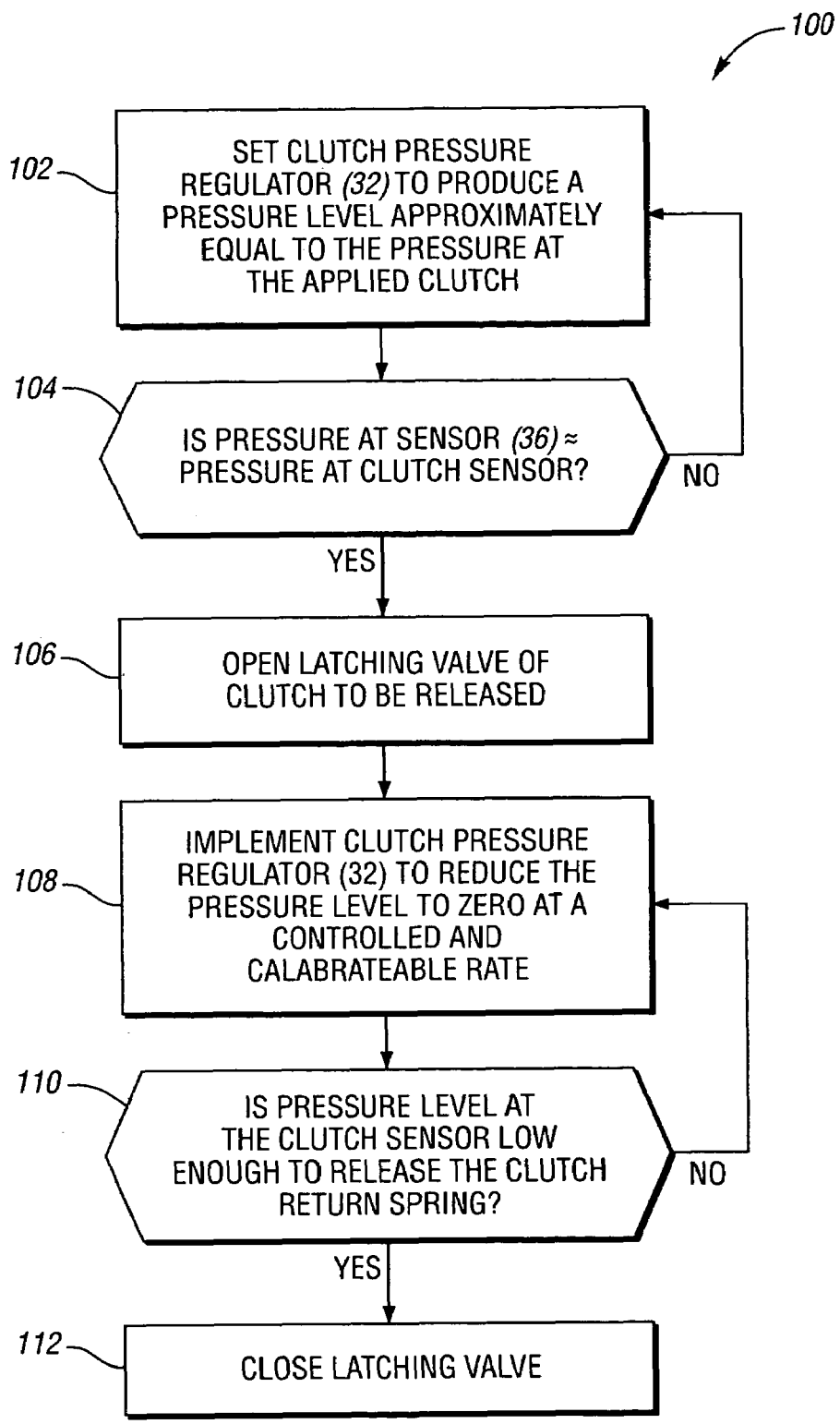
FIG. 3 is a flow chart illustrating the preferred method of releasing a clutch in accordance with the present invention.

Referring to FIG. 3, a method 100 (also referred to herein as algorithm 100) for releasing or disengaging a clutch (e.g., clutch 50 shown in FIG. 1) is shown. More precisely, FIG. 3 shows a block diagram representing steps performed by a control device such as a conventional control module (not shown).

At step 102, the clutch pressure regulator 32 (shown in FIG. 1) is implemented to produce a downstream pressure level approximately equal to the pressure level at the pressure sensor 74 (shown in FIG. 1). This step is preferably implemented to produce an approximately zero pressure differential across the latching valve 62 (shown in FIG. 1) such that, when the latching valve 62 is opened, the pressure at the clutch 50 (shown in FIG. 1) does not abruptly drop and release the clutch 50. In other words, the clutch 50 can be released in a much smoother manner by controlling the rate at which the pressure is released. At step 104, the algorithm 100 compares the pressure level measured by the sensor 36 (shown in FIG. 1) with the pressure level measured by the sensor 74. If the pressure level at sensor 36 is not approximately equal to the pressure level at the sensor 74, the algorithm 100 returns to step 102. If the pressure level at sensor 36 is approximately equal to the pressure level at the sensor 74, the algorithm 100 proceeds to step 106.

At step 106, the latching valve 62 (shown in FIG. 1) is opened. As the pressure level across the latching valve 62 is approximately zero as verified at step 104, the clutch 50 (shown in FIG. 1) remains engaged. At step 108, the clutch pressure regulator 32 (shown in FIG. 1) is implemented to reduce the pressure level at the clutch 50 to approximately zero at a controlled and calabratable rate such that the clutch 50 is smoothly released. At step 110, the algorithm 100 checks the pressure sensor 74 (shown in FIG. 1) to ensure the pressure level at the clutch 50 is low enough to release the return spring (not shown) of the apply piston 56 (shown in FIG. 1). This step is preferably implemented to ensure the clutch 50 is released before closing the latching valve 62. If, at step 110, the pressure level at the clutch 50 is not low enough to release the return spring of the apply piston 56, the algorithm 100 returns to step 108. If, at step 110, the pressure level at the clutch 50 is low enough to release the return spring of the apply piston 56, the algorithm 100 proceeds to step 112. At step 112, the latching valve 62 is closed.

While the best modes for carrying out the invention have been described in detail, those familiar with the art to which this invention relates will recognize various alternative designs and embodiments for practicing the invention within the scope of the appended claims.

The invention claimed is:

1. A method for controlling the hydraulic actuation of a selectively engageable torque transmitting device in a vehicle comprising:
   generating a predetermined pressure level of a hydraulic fluid;
   transferring the pressurized hydraulic fluid through an open valve and to the selectively engageable torque transmitting device such that the selectively engageable torque transmitting device is engaged; and
   closing said valve so that the predetermined pressure level of hydraulic fluid at the selectively engageable torque transmitting device remains relatively constant, wherein the selectively engageable torque transmitting device remains engaged without requiring additional pressure such that the fuel economy of the vehicle is improved.

2. The method of claim 1, further comprising monitoring the pressure level of the hydraulic fluid near the selectively engageable torque transmitting device.

3. The method of claim 2, further comprising generating additional pressure if the monitored pressure of the hydraulic fluid drops below a predefined minimum pressure value.

4. The method of claim 2, wherein said monitoring the pressure of the hydraulic fluid near the selectively engageable torque transmitting device includes providing a pressure sensor disposed between the valve and the selectively engageable torque transmitting device.

5. The method of claim 1, wherein said generating the predetermined pressure level of the hydraulic fluid includes implementing a pump to generate pressure.

6. The method of claim 5, further comprising providing a pressure regulator disposed between the pump and the selectively engageable torque transmitting device, said pressure regulator being configured to control the rate at which torque from the selectively engageable torque transmitting device is increased and decreased without controlling the pump.

7. A method for controlling the hydraulic actuation of a selectively engageable torque transmitting device in a hybrid electric vehicle comprising:
    generating a predetermined pressure level of a hydraulic fluid;
    transferring the pressurized hydraulic fluid through an open valve and to the selectively engageable torque transmitting device such that the selectively engageable torque transmitting device is engaged;
    closing the valve so that the predetermined pressure level of hydraulic fluid at the selectively engageable torque transmitting device remains relatively constant, wherein the selectively engageable torque transmitting device remains engaged without requiring the continuous generation of pressure such that the fuel economy of the hybrid electric vehicle is improved;
    monitoring the pressure of the hydraulic fluid at a point between the valve and the selectively engageable torque transmitting device; and
    generating additional pressure if the monitored pressure of the hydraulic fluid drops below a predefined minimum pressure.

8. The method of claim 7, wherein said monitoring the pressure of the hydraulic fluid near includes implementing a pressure sensor disposed between the valve and the selectively engageable torque transmitting device.

9. The method of claim 7, wherein said generating the predetermined pressure level of the hydraulic fluid includes implementing a pump to generate pressure.

10. The method of claim 9, further comprising providing a pressure regulator disposed between the pump and the selectively engageable torque transmitting device.

11. An apparatus for controlling the hydraulic actuation of a selectively engageable torque transmitting device in a hybrid electric vehicle comprising:
    a hydraulic fluid distribution device configured to transfer hydraulic fluid at a predetermined pressure level;
    a selectively engageable torque transmitting device in fluid communication with the distribution device, the selectively engageable torque transmitting device configured to engage when pressurized hydraulic fluid at the predetermined pressure level is transferred thereto; and
    said selectively engageable torque transmitting device, a latching valve configured to selectively open and thereby allow the transfer of pressurized hydraulic fluid from the distribution device to the selectively engageable torque transmitting device such that the selectively engageable torque transmitting device is engaged, said latching valve thereafter controllable to close so that the predetermined pressure level of hydraulic fluid at the selectively engageable torque transmitting device remains relatively constant, wherein the selectively engageable torque transmitting device remains engaged without requiring continuous generation of pressure such that the fuel economy of the hybrid electric vehicle is improved.

12. The apparatus of claim 11, further comprising a pressure sensor disposed between the latching valve and the selectively engageable torque transmitting device, said pressure sensor configured to monitor the pressure level at the selectively engageable torque transmitting device.

13. The apparatus of claim 12, further comprising a pressure regulator disposed between the distribution device and the latching valve, said pressure regulator configured to regulate the transfer of pressurized hydraulic fluid to the selectively engageable torque transmitting device.

14. The apparatus of claim 13, wherein the hydraulic fluid distribution device is a pump.

15. The apparatus of claim 14, wherein the selectively engageable torque transmitting device is a clutch.

* * * * *